(12) United States Patent
Cheng

(10) Patent No.: US 10,597,102 B2
(45) Date of Patent: Mar. 24, 2020

(54) ADJUSTABLE STRUCTURE FOR REAR SEAT OF BICYCLE

(71) Applicant: Yuan-Lin Cheng, Changhua (TW)

(72) Inventor: Yuan-Lin Cheng, Changhua (TW)

(73) Assignees: Eli International Enterprise Co, LTD, Changhua (TW); Pao-Chin Cheng chen, Changhua (TW)

( * ) Notice: Subject to any disclaimer, the term of this patent is extended or adjusted under 35 U.S.C. 154(b) by 16 days.

(21) Appl. No.: 16/169,984

(22) Filed: Oct. 24, 2018

(65) Prior Publication Data

US 2019/0061854 A1 Feb. 28, 2019

(51) Int. Cl.
*B62J 1/28* (2006.01)
*B62J 7/04* (2006.01)
*B62K 19/36* (2006.01)

(52) U.S. Cl.
CPC . *B62J 1/28* (2013.01); *B62J 7/04* (2013.01); *B62K 19/36* (2013.01)

(58) Field of Classification Search
CPC ................ B62J 1/28; B62J 7/04; B62K 19/36
USPC ..................................................... 297/195.12
See application file for complete search history.

(56) References Cited

U.S. PATENT DOCUMENTS

| 810,814 | A | * | 1/1906 | Santini | ...................... 297/195.12 |
| 6,349,958 | B1 | * | 2/2002 | Gawlik | ..................... B62H 7/00 16/110.1 |
| 6,631,948 | B1 | * | 10/2003 | Tsuge | ......................... B62J 1/00 297/195.12 |
| 8,308,233 | B1 | * | 11/2012 | Gradington | ................ B62J 1/14 297/195.12 |

* cited by examiner

*Primary Examiner* — Anthony D Barfield

(57) ABSTRACT

An adjustable structure for rear seat of bicycle has a rear seat, a clamp, and a connection member. The rear seat and the clamp are respectively arranged a first teeth portion and a second teeth portion. The connection member has a third teeth portion and a fourth teeth portion. The first teeth portion and the third teeth portion are engaged with each other and the second teeth portion and the fourth teeth portion are engaged with each other. The first, second, third, and fourth teeth portions are allowed a little rotation. It may adjust position without totally releasing the screws. It may be quickly positioned.

4 Claims, 4 Drawing Sheets

ADJUSTABLE STRUCTURE FOR REAR SEAT OF BICYCLE

FIELD OF THE INVENTION

The present invention relates to an adjusting structure for rear seat of bicycle, and more particularly to an adjusting structure for easily and quickly adjusting and stable structure.

BACKGROUND OF THE INVENTION

Please refer to Taiwanese patent No. M250854, it discloses a collapsible and adjustable structure for leaning cushion of bicycle and the like. It comprises a frame, and a seat post and a leaning cushion. The bottom of a supporting rod of the leaning cushion is pivoted to a suitable position of the frame which is located at a rear side of the seat post. A linking rod is arranged at the supporting rod and the end of the linking rod opposite to the supporting rod has at least one fixing hole for providing the fixing member arranged on the seat post to pass through and position. According to above arrangement, when the fixing member passes through the fixing hole and the linking rod is fixed on the seat post, the leaning cushion which stays vertically is located in back of the saddle so as to provide the back of the user to lean against. When the fixing member moves away from the fixing hole of the lining rod to make the linking rod release from the seat post, the fixing member may be the fulcrum to make the leaning cushion and the supporting rod pivot to collapse. Therefore, it may be collapsible and adjustable.

As above mentioned structure, the fixing member may only pass through the fixing holes on the linking rod. The range of angular adjustment is narrow. It does not satisfy the riders with different stature.

In addition, it may not to support other loadings or objects.

In view of the foregoing circumstances, the inventor has invested a lot of time to study the relevant knowledge, compare the pros and cons, research and develop related products. After quite many experiments and tests, the "adjustable structure for rear seat of bicycle" of this invention is eventually launched to improve the foregoing shortcomings, to meet the public use.

SUMMARY OF THE INVENTION

An object of this invention is provided an adjustable structure for rear seat of bicycle. The rear seat and the clamp are respectively arranged a first teeth portion and a second teeth portion. The connection member has a third teeth portion and a fourth teeth portion. The first teeth portion and the third teeth portion are engaged with each other and the second teeth portion and the fourth teeth portion are engaged with each other. The first, second, third, and fourth teeth portions are allowed a little rotation. It may adjust position without totally releasing the screws. It may be quickly positioned.

Another object of this invention is provided an adjustable structure for rear seat of bicycle. Due to the engagement of the first teeth portion and the third teeth portion and the engagement of the second teeth portion and the fourth teeth portion, the supporting capacity of the rear seat is increased by screwing the screws and the nuts so as to prevent from shifting.

In order to achieve above objects, an adjustable structure for rear seat of bicycle is provided and mainly comprises a rear seat, a clamp, and a connection member, wherein one end of the rear seat is used for carrying an object, the other end thereof opposite to the object has a rear-seat linking portion which is linked to the connection member, one side of the rear seat having the rear-seat linking portion includes a rear-seat linking surface, the rear-seat linking portion is protruded from the rear-seat linking surface, a rear-seat through hole is formed at a center of the rear-seat linking portion, a rear-seat stopping surface is downwardly formed from a top surface of the rear-seat linking portion, and a wall surface of the rear-seat linking portion has a first rear-seat teeth portion and a second rear-seat teeth portion; the clamp is linked to a seat post of a bicycle, one side of the clamp opposite to the seat post has a clamp linking portion which is linked to the connection member, the side of the clamp having the clamp linking portion includes a clamp linking surface, the clamp linking portion is protruded from the clamp linking surface, a clamp through hole is formed at a center of the clamp linking portion, a clamp stopping surface is downwardly formed from a top surface of the clamp linking portion, and a wall surface of the clamp linking portion has a first clamp teeth portion and a second clamp teeth portion; and the connection member is used for connect the rear seat and the clamp, two sides of the connection member are respectively arranged a connection portion, a peripheral of the connection portion has a connection surface which is used to attach the rear-seat linking surface and the clamp linking surface, the connection portion is used to fix the rear-seat linking portion and the clamp linking portion, a height of the connection portion is lower than a height of the connection surface, a wall surface of the connection portion has a third teeth portion, the connection portion has a convex body, a wall surface of the convex body has a fourth teeth portion, the third teeth portion of the connection portion adjacent to the rear seat is arranged corresponding to the first rear-seat teeth portion, the third teeth portion of the connection portion adjacent to the clamp is arranged corresponding to the first clamp teeth portion, the fourth teeth portion of the connection portion adjacent to the rear seat is arranged corresponding to the second rear-seat teeth portion, the fourth teeth portion of the connection portion adjacent to the clamp is arranged corresponding to the second clamp teeth portion, the connection portion has a connection through hole, the connection through hole of the connection portion adjacent to the rear seat is arranged corresponding to the rear-seat through hole, the connection through hole of the connection portion adjacent to the clamp is arranged corresponding to the clamp through hole, a top of the convex body of the connection portion adjacent to the rear seat is abutted against the rear-seat stopping surface, a top of the convex body of the connection portion adjacent to the clamp is abutted against the clamp stopping surface, and then the connection member connects with the rear seat and the clamp through multiple screws and nuts.

According to above mentioned structure, the effects are provided and described as follows.

Firstly, the teeth portions arranged on the linking portion and the connection portion are engaged with each other so that the shearing force produced to abut against the weight of the rear seat is provided and prevent the rear seat from shifting.

Secondly, the rear seat may be angularly adjusted without totally releasing the screws and the nuts. It may achieve the effects of quick adjustment and convenience.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
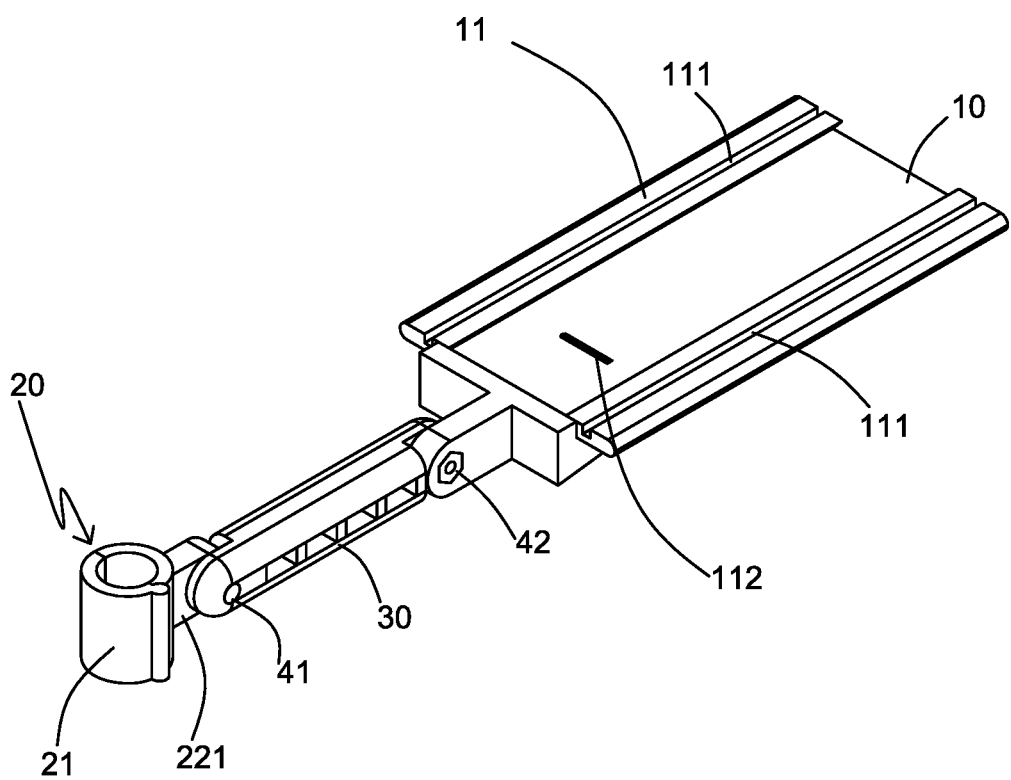
FIG. 1 is a perspective view of an adjustable structure for rear seat of bicycle of the present invention.

Referring now to the drawings where like characteristics and features among the various figures are denoted by like reference characters.

Figure 2:
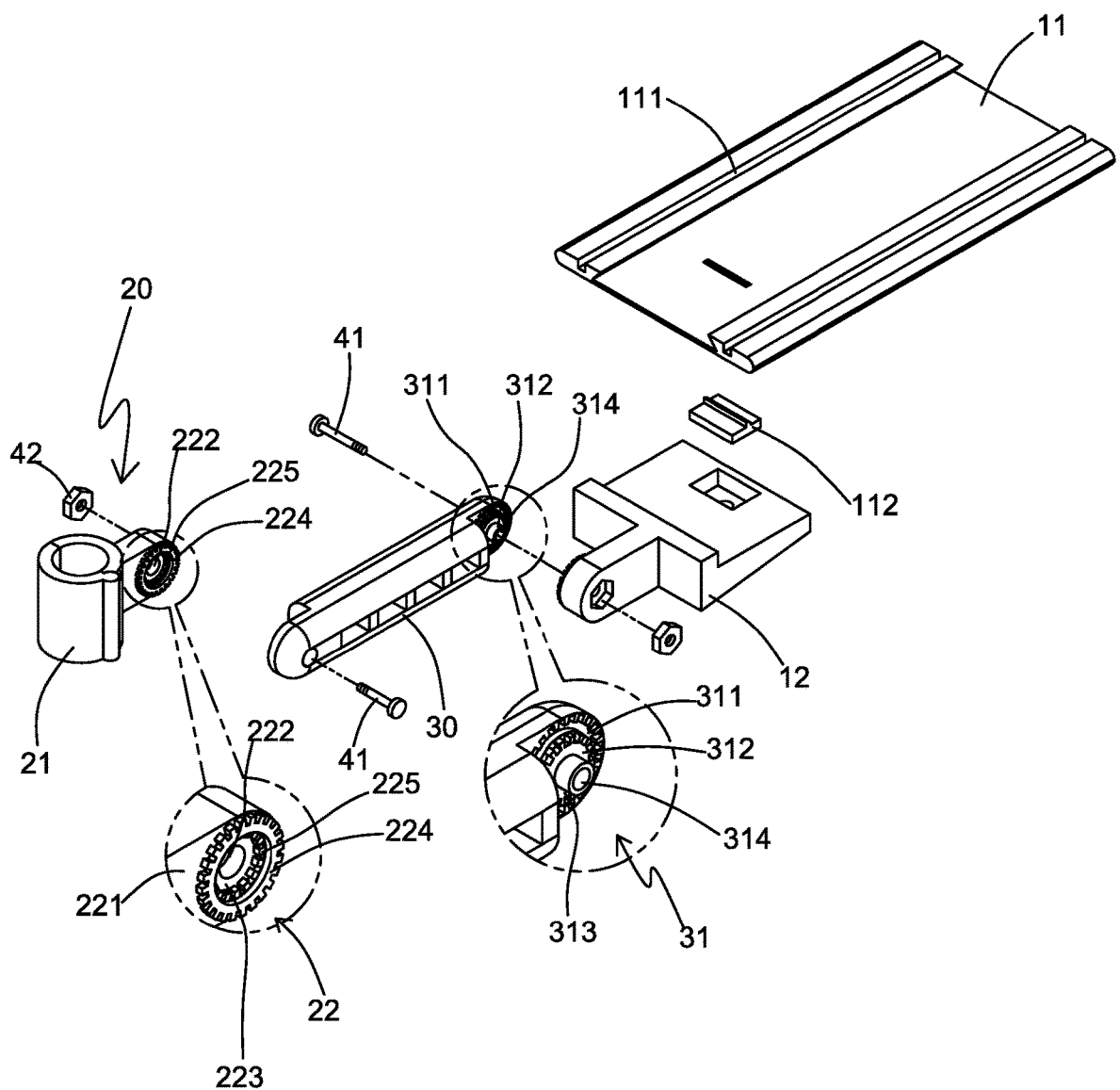
FIG. 2 is an exploded view of the adjustable structure for rear seat of bicycle of the present invention.
Figure 3:
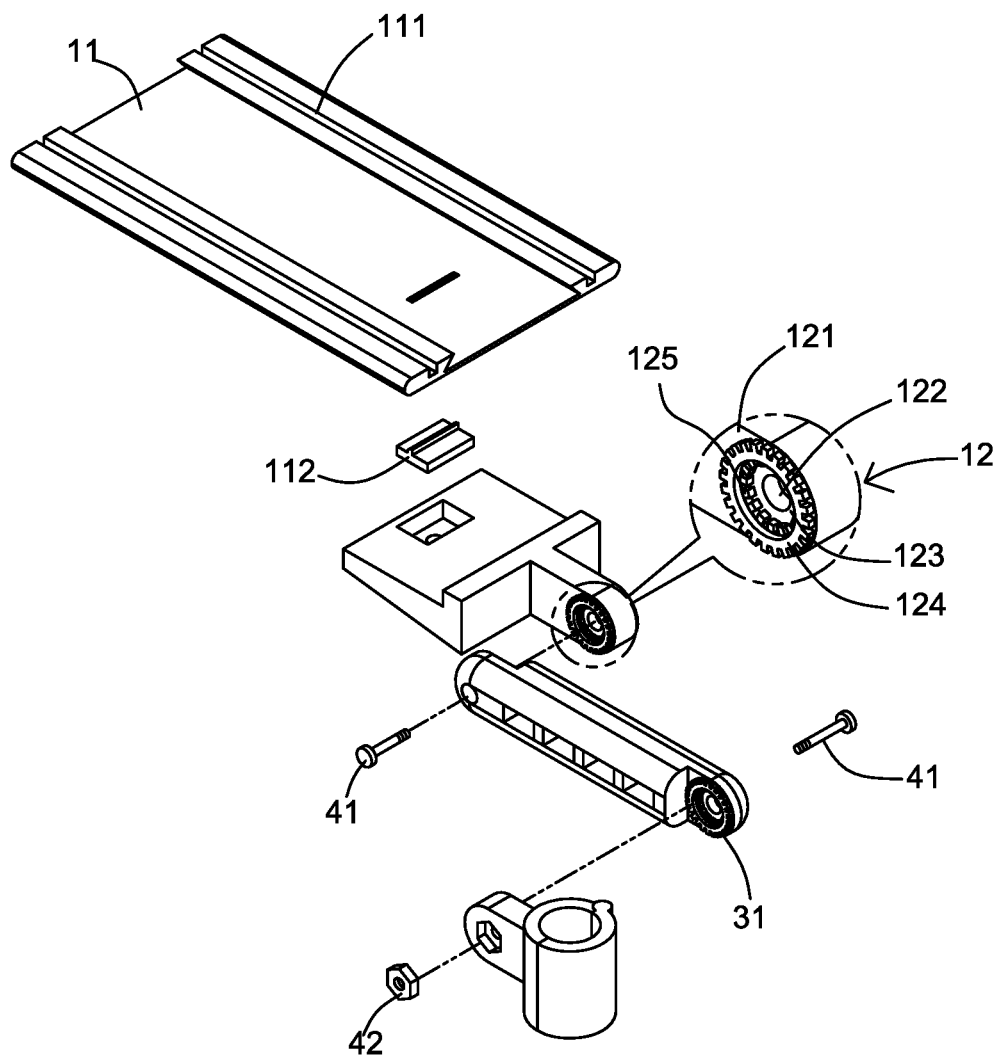
FIG. 3 is another exploded view of the adjustable structure for rear seat of bicycle of the present invention.
Figure 4:
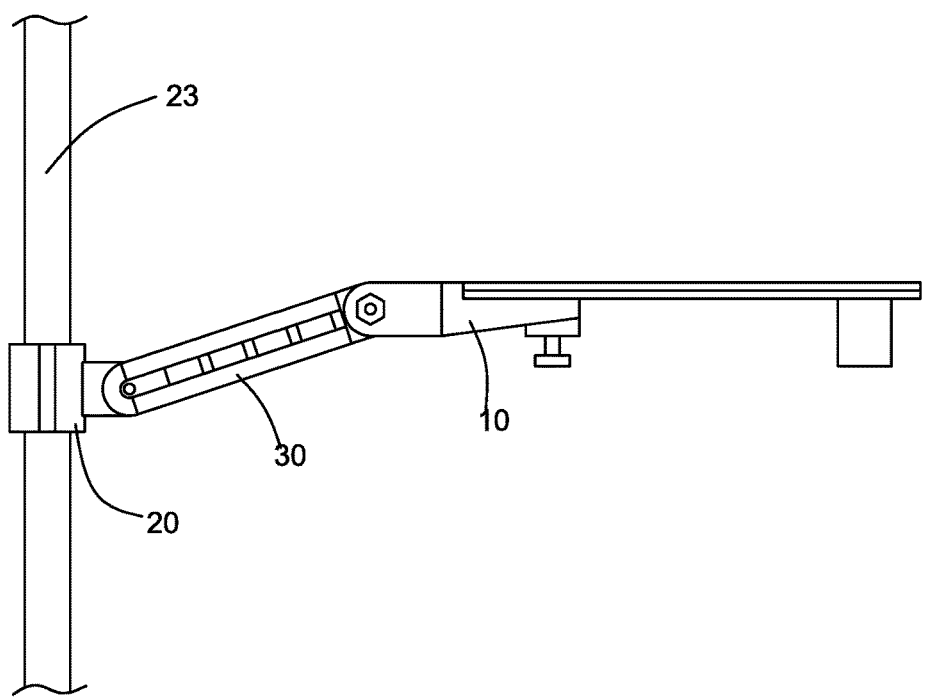
FIG. 4 is a plan view of the adjustable structure for rear seat of bicycle of the present invention while in use.

Please refer to FIGS. 1 to 4, the adjustable structure for rear seat of bicycle mainly comprises a rear seat 10, a clamp 20, and a connection member 30.

One end of the rear seat 10 has a plate body 11 which is used for carrying an object. At least one sliding slot 111 is arranged on the plate body 11. The bottom of the at least one sliding slot 111 has an elastic pushing member 112 which is used for fastening the object. The object may be a duffel bag, back cushion, and etc. The other end of the rear seat 10 opposite to the object has a rear-seat linking portion 12 which is linked to the connection member 30. One side of the rear seat 10 having the rear-seat linking portion 12 includes a rear-seat linking surface 121. The rear-seat linking portion 12 is slightly protruded from the rear-seat linking surface 121. A rear-seat through hole 122 is formed at a center of the rear-seat linking portion 12. A rear-seat stopping surface 123 is downwardly formed from a top surface of the rear-seat linking portion 12. The rear-seat linking portion is like circular pipe. And a wall surface of the rear-seat linking portion 12 has a first rear-seat teeth portion 124 and a second rear-seat teeth portion 125.

The clamp 20 is linked to a seat post 23 of a bicycle (not shown). The clamp 20 has an arc clamping piece 21 for clamping the seat post 23. One side of the clamp 20 opposite to the seat post 23 has a clamp linking portion 22 which is linked to the connection member 30. The side of the clamp 20 having the clamp linking portion 22 includes a clamp linking surface 221. The clamp linking portion 22 is slightly protruded from the clamp linking surface 221. A clamp through hole 222 is formed at a center of the clamp linking portion 22. A clamp stopping surface 223 is downwardly formed from a top surface of the clamp linking portion 22. And a wall surface of the clamp linking portion 22 has a first clamp teeth portion 224 and a second clamp teeth portion 225.

The connection member 30 is used for connect the rear seat 10 and the clamp 20. Two sides of the connection member 30 are respectively arranged a connection portion 31. A peripheral of the connection portion 31 has a connection surface which is used to attach the rear-seat linking surface 121 and the clamp linking surface 221. The connection portion 31 is used to fix the rear-seat linking portion 12 of the rear seat 10 and the clamp linking portion 22 of the clamp 20. A height of the connection portion 31 is lower than a height of the connection surface. A wall surface of the connection portion 31 has a third teeth portion 311. The connection portion 31 has a convex body 312. A wall surface of the convex body 312 has a fourth teeth portion 313. The third teeth portion 311 of the connection portion 31 adjacent to the rear seat 10 is arranged corresponding to the first rear-seat teeth portion 124. The third teeth portion 311 of the connection portion 31 adjacent to the clamp 20 is arranged corresponding to the first clamp teeth portion 224. The fourth teeth portion 313 of the connection portion 31 adjacent to the rear seat 20 is arranged corresponding to the second rear-seat teeth portion 125. The fourth teeth portion 313 of the connection portion 31 adjacent to the clamp 20 is arranged corresponding to the second clamp teeth portion 225. The connection portion 31 has a connection through hole. The connection through hole of the connection portion 31 adjacent to the rear seat 10 is arranged corresponding to the rear-seat through hole 122. The connection through hole of the connection portion 31 adjacent to the clamp 20 is arranged corresponding to the clamp through hole 222. A top of the convex body 312 of the connection portion 31 adjacent to the rear seat 20 is abutted against the rear-seat stopping surface 123. A top of the convex body 312 of the connection portion 31 adjacent to the clamp 20 is abutted against the clamp stopping surface 223. And then the connection member 30 connects with the rear seat 10 and the clamp 20 through multiple screws 41 and nuts 42.

According to above mentioned structure, there are many effects being achieved and described as follows.

Firstly, the screws 41 are screwed in the connection member 30 by a tool and the nuts 42 are respectively installed and fix to a linking member and the clamp 20 by the tool. The third teeth portion 311 is concave and the rear-seat first teeth portion 124 and the clamp first teeth portion 224 are convex so that they may be integrated with each other. The fourth teeth portion 313 is arranged on the convex body 312 and the second rear-seat teeth portion 125 and the second clamp teeth portion 225 are respectively arranged at an inner side of the first rear-seat teeth portion 124 and an inner side of the first clamp teeth portion 224 so that they may be also integrated with each other. Due to the two integration structure, the total structure may be stable after screwing and fixing and prevent from shifting.

Secondly, in some embodiment, one side of the connection member 30 opposite to the connection portion 31 has a counterbored hole. One end of the clamp 20 opposite to the clamp linking portion 22 and one end of the rear seat 10 opposite to the rear-seat linking portion 12 are respectively arranged a hexagonal socket for providing the nuts 42 to fix. In some embodiment, a quick release may be selected.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. An adjustable structure for rear seat of bicycle, mainly comprising a rear seat, a clamp, and a connection member, wherein:

one end of the rear seat is used for carrying an object, the other end thereof opposite to the object has a rear-seat linking portion which is linked to the connection member, one side of the rear seat having the rear-seat linking portion includes a rear-seat linking surface, the rear-seat linking portion is protruded from the rear-seat linking surface, a rear-seat through hole is formed at a center of the rear-seat linking portion, a rear-seat stopping surface is downwardly formed from a top surface of the rear-seat linking portion, and a wall surface of the rear-seat linking portion has a first rear-seat teeth portion and a second rear-seat teeth portion;

the clamp is linked to a seat post of a bicycle, one side of the clamp opposite to the seat post has a clamp linking portion which is linked to the connection member, the side of the clamp having the clamp linking portion includes a clamp linking surface, the clamp linking portion is protruded from the clamp linking surface, a clamp through hole is formed at a center of the clamp linking portion, a clamp stopping surface is downwardly formed from a top surface of the clamp linking portion, and a wall surface of the clamp linking portion has a first clamp teeth portion and a second clamp teeth portion; and the connection member is used for connect the rear seat and the clamp, two sides of the connection member are respectively arranged a connection portion, a peripheral of the connection portion has a connection surface which is used to attach the rear-seat linking surface and the clamp linking surface, the connection portion is used to fix the rear-seat linking portion and the clamp linking portion, a height of the connection portion is lower than a height of the connection surface, a wall surface of the connection portion has a third teeth portion, the connection portion has a convex body, a wall surface of the convex body has a fourth teeth portion, the third teeth portion of the connection portion adjacent to the rear seat is arranged corresponding to the first rear-seat teeth portion, the third teeth portion of the connection portion adjacent to the clamp is arranged corresponding to the first clamp teeth portion, the fourth teeth portion of the connection portion adjacent to the rear seat is arranged corresponding to the second rear-seat teeth portion, the fourth teeth portion of the connection portion adjacent to the clamp is arranged corresponding to the second clamp teeth portion, the connection portion has a connection through hole, the connection through hole of the connection portion adjacent to the rear seat is arranged corresponding to the rear-seat through hole, the connection through hole of the connection portion adjacent to the clamp is arranged corresponding to the clamp through hole, a top of the convex body of the connection portion adjacent to the rear seat is abutted against the rear-seat stopping surface, a top of the convex body of the connection portion adjacent to the clamp is abutted against the clamp stopping surface, and then the connection member connects with the rear seat and the clamp through multiple screws and nuts.

2. The adjustable structure as claimed in claim 1, wherein a counterbored hole is arranged at one side of the connection member opposite to the connection portion, and one end of the clamp opposite to the clamp linking portion and one end of the rear seat opposite to the rear-seat linking portion are respectively arranged a hexagonal socket for providing the nuts to fix.

3. The adjustable structure as claimed in claim 1, wherein the rear seat has at least one sliding slot, and an elastic pushing member is arranged at bottom of the at least one sliding slot so that the object which is guided into the at least one sliding slot is fixed by the elastic pushing member.

4. The adjustable structure as claimed in claim 1, wherein the clamp has an arc clamping piece for clamping the seat post.

* * * * *